United States Patent
Evans et al.

(10) Patent No.: US 6,862,135 B2
(45) Date of Patent: Mar. 1, 2005

(54) RAMAN AMPLIFIERS WITH IMPROVED SIGNAL POWER MANAGEMENT

(75) Inventors: Alan F. Evans, Beaver Dams, NY (US); Stuart Gray, Corning, NY (US); George Wildeman, Painted Post, NY (US)

(73) Assignee: Avanex Corporation, Fremont, CA (US)

( * ) Notice: Subject to any disclaimer, the term of this patent is extended or adjusted under 35 U.S.C. 154(b) by 306 days.

(21) Appl. No.: 10/178,799

(22) Filed: Jun. 24, 2002

(65) Prior Publication Data

US 2003/0234974 A1 Dec. 25, 2003

(51) Int. Cl.[7] .................................................. H01S 3/00
(52) U.S. Cl. ................... 359/337.1; 359/337.4
(58) Field of Search ............................ 359/337.1, 337.4

(56) References Cited

U.S. PATENT DOCUMENTS 6,556,341 B2 * 4/2003 Krummrich et al. ........ 359/334
6,646,788 B2 * 11/2003 Islam et al. .................. 359/334

* cited by examiner

Primary Examiner—Mark Hellner
(74) Attorney, Agent, or Firm—Moser, Patterson & Sheridan, L.L.P.

(57) ABSTRACT

An optical link comprises a first optical amplifier having a first gain spectrum with a first gain ripple and a second optical amplifier having a second gain spectrum with a second gain ripple. A combined gain spectrum of the first and second gain spectra is substantially flat and has a gain ripple that is substantially less than either the first gain ripple or the second gain ripple over a particular wavelength range.

18 Claims, 5 Drawing Sheets

RAMAN AMPLIFIERS WITH IMPROVED SIGNAL POWER MANAGEMENT

FIELD OF THE INVENTION

The present invention relates generally to optical amplifiers, and specifically to Raman amplifiers with improved signal power management.

BACKGROUND

The increasing demand for high-speed voice and data communications has led to an increased reliance on optical communications, especially optical fiber communications. The use of optical signals as a vehicle to carry information (often channeled) at high speed is preferred in many instances to carrying channeled information at other electromagnetic wavelengths/frequencies in media such as microwave transmission lines, coaxial cable lines, and twisted copper pair transmission lines.

Advantages of optical media include higher channel capacities (bandwidth), greater immunity to electromagnetic interference, and lower propagation loss. In fact, it is common for high-speed optical systems to have signal rates in the range of approximately several megabits per second (Mbit/s) to approximately several tens of gigabits per second (Gbit/s), and greater. However, as the communication capacity is further increased to transmit greater amounts of information at greater rates over fiber, maintaining signal integrity can be exceedingly challenging.

The emergence of optical communications as a useful vehicle for short and long haul data and voice communications has led to the development of a variety of optical amplifiers. One type of optical amplifier is the rare-earth metal optical amplifier. One such rare-earth metal optical amplifier is one based on erbium-doped silica fiber. The erbium doped fiber amplifier (EDFA) is widely used in the telecommunications industry.

While the EDFA has certain advantages, another type of optical amplifier is based on stimulated Raman scattering. To this end, when pump-light intensity within an optical waveguide (e.g., an optical fiber) becomes large, the glass molecules are excited into different vibrational states. In stimulated Raman scattering, the difference between two vibrational states can be used to amplify an optical signal, and thereby a device known as a Raman amplifier. Unlike rare-earth doped fiber amplifiers, the Raman amplifier does not require special dopants; Raman amplification may occur in the silica glass and in doped regions used to create the index differential to form the waveguide (e.g., Ge). Accordingly, the Raman amplifier can use the actual transmission waveguide as the gain medium.

The Raman amplifier typically uses a pump laser having a frequency that is separated by a predetermined amount from that of the optical signal frequency. This separation is normally on the order of approximately −13 THz (100 nm). Illustratively, for a 1.55 $\mu$m signal wavelength, a pump laser having a wavelength of 1.45 $\mu$m is used to induce stimulated scattering.

Raman amplifiers offer further advantages compared to rare-earth fiber amplifiers. For example, that the signal-to-noise ratio of a 15×100 km span Raman amplifier system is the same as a 6×100 EDFA system. This is due to the comparative reduction in cascaded noise build-up in the Raman system, enabling optical signals to pass more amplifying stages before it is sufficiently degraded to warrant detection and electronic regeneration. Because the electrical regeneration is required for individual wavelengths, and becomes more complex with increased transmission rate, it is far more costly than optical amplification, which is substantially bit rate independent, and capable of multi-channel amplification.

It is desired to provide Raman-based amplifiers that provide substantially flat gain over a relatively broad wavelength band, with low ripple, as well as other useful characteristics.

SUMMARY OF THE INVENTION

In accordance with an exemplary embodiment of the present invention, an optical link comprises a first optical amplifier having a first gain spectrum with a first gain ripple and a second optical amplifier having a second gain spectrum with a second gain ripple. A combined gain spectrum of the first and second gain spectra is substantially flat and has a gain ripple that is substantially less than either the first gain ripple or the second gain ripple over a particular wavelength range.

In accordance with another exemplary embodiment of the present invention, a method of amplifying an optical signal includes providing a first optical amplifier having a first gain spectrum with a first gain ripple and a second optical amplifier having a second gain spectrum with a second gain ripple. The method further comprises forming a resultant gain spectrum by combining the first and second gain spectra. The resultant gain spectrum has a substantially flat gain and a gain ripple that is substantially less than either the first gain ripple or the second gain ripple over a particular wavelength band.

Defined Terminology

Gain flatness is typically measured in terms of fractional gain ripple, the ratio of the maximum minus minimum gain divided by minimum gain over the full wavelength bandwidth of the signal. In this application the term gain ripple is also used to refer to signal output power, which is the maximum output power minus the minimum output power divided by the minimum output power from the amplifier. In the case of distributed Raman amplification, output power from the amplifier is substantially the same as the output power from the transmission fiber.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art that the present invention may be practiced in other embodiments that depart from the specific details disclosed herein. In other instances, detailed descriptions of well-known devices and methods may be omitted so as not to obscure the description of the present invention.

Briefly, as described in conjunction with exemplary embodiments, the present invention relates to a method and apparatus for amplifying an optical signal, wherein a resultant gain spectrum is substantially flat and has significantly reduced gain ripple over a particular wavelength range. In accordance with an exemplary embodiment of the present invention, the substantially flat gain spectrum is realized by combining the gain spectrum of a first optical amplifier, having a first gain ripple, with that of a second optical amplifier, having a second gain ripple. The resultant gain spectrum illustratively has a gain ripple across the particular wavelength ranges that is significantly reduced compared to the gain ripple of either the first or the second optical amplifiers. Usefully, the second gain spectrum is substantially complementary to that of the first gain spectrum. This results in the desired resultant gain spectrum.

Beneficially, the present invention enables the realization of a gain spectrum that has substantially reduced gain ripple and substantially flat gain using significantly fewer components in each amplifier and overall, when compared to known methods and apparati.

It is noted that present description focuses on the application of the exemplary embodiments of the present invention to Raman amplifiers. In an optical link, discrete or distributed Raman amplifiers, or both, may be used. It is noted however, that a basic tenet of the present invention, the effective combination (superposition) of gain spectra of two or more amplifiers to achieve desired ends and advantages described in detail herein, could be implemented with other types of optical amplifiers.

Figure 1:
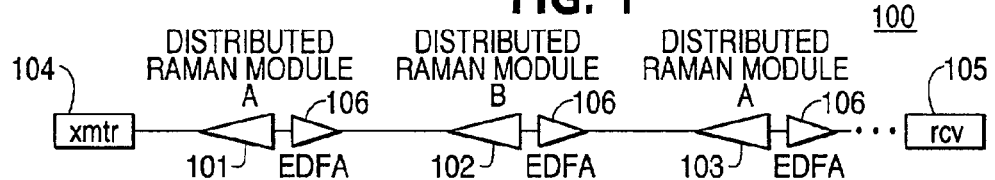
FIG. 1 is a schematic view of an optical link having optical amplifiers across the link in accordance with an exemplary embodiment of the present invention.

FIG. 1 shows an optical link 100 in accordance with an exemplary embodiment of the present invention. The optical link 100 includes a transmitter 104 and a receiver 105, which can be of various types known to one of ordinary skill in the art. It is noted that, although a single transmitter and receiver are shown to facilitate clarity of discussion, in general, there is a plurality of transmitter and receiver pairs, one for each signal channel wavelength of the optical link.

The optical link 100 further includes a first distributed Raman amplifier 101, a second distributed Raman amplifier 102, and a third distributed Raman amplifier 103, with this sequence continued as desired. The optical link 100 can have a plurality of such amplifiers between the transmitter 104 and the receiver 105. Illustratively, the first and second distributed Raman amplifiers 101 and 102, respectively, include transmission optical fiber of lengths typically greater than 10 km and less than 120 km and propagating laser light (known as the Raman pump) in the wavelength range of approximately 1420 to 1510 nm wavelength.

The distributed Raman amplifiers of the optical link 100 usefully alternate in type serially. For example, in the exemplary embodiment shown in FIG. 1, the first distributed Raman amplifier 101 is the same as the third distributed Raman amplifier 103, while the second distributed Raman amplifier 102 would be the same as a fourth distributed Raman amplifier (not shown). As described in detail below, a substantive difference between adjacent distributed Raman amplifiers is that they have different pump wavelengths.

As will become clearer as the present description continues, adjacent pairs of Raman modules (e.g. first distributed Raman amplifier 101 and second distributed Raman amplifier 102) have substantially complementary gain spectra such that the superposition of their respective spectra results in an output that is substantially flat and has a gain ripple that is substantially reduced; to wit a fraction (less than unity, of course) of the gain ripple of either of the first or the second distributed Raman amplifiers. Illustratively, the resultant gain ripple of the combined output of the first and second Raman amplifiers 101 and 102, respectively, at the second Raman amplifier 102 is approximately one-half of that of the gain ripple of either the first distributed Raman amplifier 101 or the second distributed Raman amplifier 102 individually. Of course, this is merely illustrative, and the resultant gain ripple could be even less.

In general, in accordance with exemplary embodiments of the present invention, there will always be a substantially complementary Raman amplifier in series with a particular Raman amplifier. However, it is noted that if an odd number of spans (the fiber links between sequential amplifiers), the 'last' Raman amplifier may have no complementary amplifier coupled thereto. In this case, the gain ripple and flatness may not be optimal, but still acceptable. Finally, it is noted that the EDFA's 106 are illustrative, and not necessary to carrying out the present invention.

Focusing on first distributed Raman amplifier 101 and second distributed Raman amplifier 102, the resultant gain spectrum, the combined spectra of these amplifiers, (at the output of second distributed Raman amplifier 102) is substantially flat and has a significantly reduced gain ripple compared to the gain ripple of the respective gain spectra of the first or the second distributed Raman amplifiers. To this end, for purposes of discussion, the first gain spectrum of the first distributed Raman amplifier 101 may have a certain gain flatness and gain ripple; and the second gain spectrum of the second distributed Raman amplifier 102 may have a certain gain flatness and gain ripple. The resultant gain spectrum that results from the superposition of the substantially complementary first and second gain spectra is substantially flat and has a resultant gain ripple that is significantly less than the gain ripple of either the first or second gain spectra. Illustratively, the resultant gain ripple is one-half (or less) than the gain ripple of the first or the second gain spectra. Similarly, the gain spectrum of the third distributed Raman amplifier 103 is substantially complementary to that of the fourth distributed Raman amplifier (no shown) to achieve a like result. Of course, this arrangement would continue as desired with additional distributed Raman amplifier pairs of the illustrative optical link 100.

Figure 2:
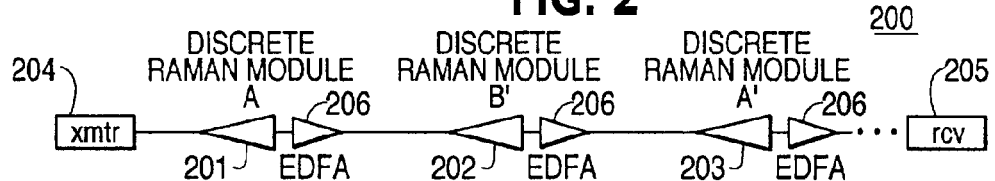
FIG. 2 is a schematic view of an optical link having optical amplifiers across the link in accordance with an exemplary embodiment of the present invention.
Figure 3:
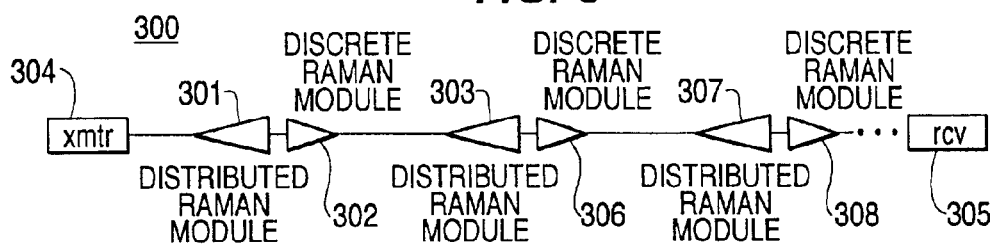
FIG. 3 is a schematic view of an optical link having optical amplifiers across the link, in accordance with an exemplary embodiment of the present invention.

FIGS. 2 and 3 show optical links in accordance with other exemplary embodiments of the present invention. Many of the elements, features and advantages of the exemplary embodiments incorporating distributed Raman amplifiers (e.g., a described in connection with the exemplary embodiment of FIG. 1) apply to the illustrative optical links of FIGS. 2 and 3. As such, common aspects generally will be not be duplicated in the interest of brevity. Often, distinctions will be elaborated upon. For example, and as will become more clear as the present description proceeds, because the gain spectrum for discrete Raman optical fiber may be different than that of distributed Raman transmission fiber, the pump wavelengths selected for a given signal bandwidth may too be different.

FIG. 2 shows a second optical link 200 in accordance with an exemplary embodiment of the present invention. The optical link 200 includes a transmitter 204 and a receiver 205, which can be of various types known to one of ordinary skill in the art. Again, although a single transmitter and receiver pair is shown, in general there is a multitude of such pairs, one for each signal channel wavelength of the optical link. The optical link 200 further includes a first discrete Raman amplifier 201, a second discrete Raman amplifier 202, a third discrete Raman amplifier 203, etc. Often, discrete Raman amplifiers consist of optical fiber typically less than 20 km in length coiled in a box with propagating laser light (known as the Raman pump) in the wavelength range of approximately 1420 to 1510 nm wavelength. The optical link 200 can have a plurality of such amplifiers between the transmitter 204 and the receiver 205.

Adjacent pairs of Raman modules (e.g. first discrete Raman amplifier 201 and second discrete Raman amplifier 202) are chosen to have substantially complementary gain spectra such that the superposition of their respective spectra results in an output that is substantially flat and has a significantly reduced gain ripple. Illustratively, the gain ripple at the output of a pair of Raman modules is approximately one-half of the gain ripple of either the first or the second discrete Raman amplifiers 201 and 202, respectively. Of course, this is merely illustrative, and could be even less. It is also noted that EDFA's 206 may be selectively incorporated, or may be omitted from stages, or altogether from this exemplary embodiment.

In the exemplary embodiment shown in FIG. 2, the first and third discrete Raman amplifiers 201 and 203, respectively, are substantially identical. Each has a certain number of optical pumps determined by factors described previously. Likewise the second discrete Raman amplifier 202 is substantially identical to a fourth discrete Raman amplifier (not shown). Continuing, alternating discrete Raman amplifiers would be substantially the same. Moreover, as described in detail above in connection with the distributed Raman amplifiers, the choice of the sequential discrete Raman amplifiers is based on the gain spectrum of the last in the sequence. To this end, a discrete Raman amplifier's gain spectrum is usefully chosen to be substantially the complement (mirror image) of the previous discrete Raman amplifier (e.g., second discrete Raman amplifier 202 is chosen to have a gain spectrum that, when superposed over the gain spectrum of the first discrete Raman amplifier 201, results in a net gain spectrum that is substantially flat and has substantially reduced gain ripple over a desired wavelength range when compared to the gain ripple of the spectra of either the first or the second discrete Raman amplifiers). It is further noted that the above sequence is illustrative of the exemplary embodiment. In general, the amplifiers are in pairs based upon complementary gain spectra (e.g., first discrete Raman amplifier 101 and second discrete Raman amplifier 102 may be such a pair).

FIG. 3 shows an optical link 300 in accordance with another exemplary embodiment of the present invention. As with other exemplary embodiments described herein, optical link 300 includes a transmitter 304 and a receiver 305, which can be of various types known to one of ordinary skill in the art. The optical link further includes a first distributed Raman amplifier 301, a first discrete Raman amplifier 302, a second distributed Raman amplifier 303, a second discrete Raman amplifier 306, a third distributed Raman amplifier 307, a third discrete Raman amplifier 307, etc.

The optical link 300 can have a plurality of such amplifiers between the transmitter 304 and the receiver 305. Adjacent pairs of Raman modules (e.g. first distributed Raman amplifier 301 and first discrete Raman amplifier 302) usefully have complementary gain spectra such that the superposition of their respective spectra results in an output that is substantially flat and has a significantly reduced gain ripple compared to the respective gain ripple characteristics of the distributed and discrete Raman amplifiers of a particular pair. Illustratively, the gain ripple at the output of such a pair is approximately one-half of the gain ripple of either amplifier of the pair (e.g., first distributed and discrete Raman amplifiers 301 and 302, respectively). Of course, this is merely illustrative, and the resultant gain ripple could be even less.

Figure 4:
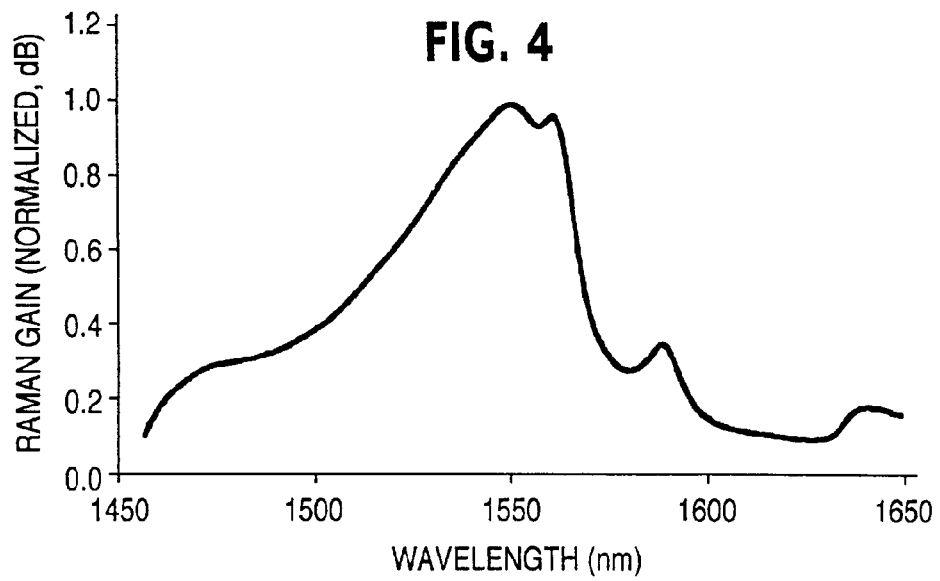
FIG. 4 is a graphical representation of an illustrative gain spectrum of a Raman amplifier.

Turning to FIG. 4, an example of the gain spectrum of a an illustrative Raman amplifier is shown. As can be appreciated, the maximum gain in this particular amplifier is at approximately 1550 nm. It is noted that in this example, there is one pump being used. The gain spectrum may be acceptable in certain applications, but the gain ripple is significantly increased compared to a Raman amplifier that has more pump wavelengths.

Figure 5:
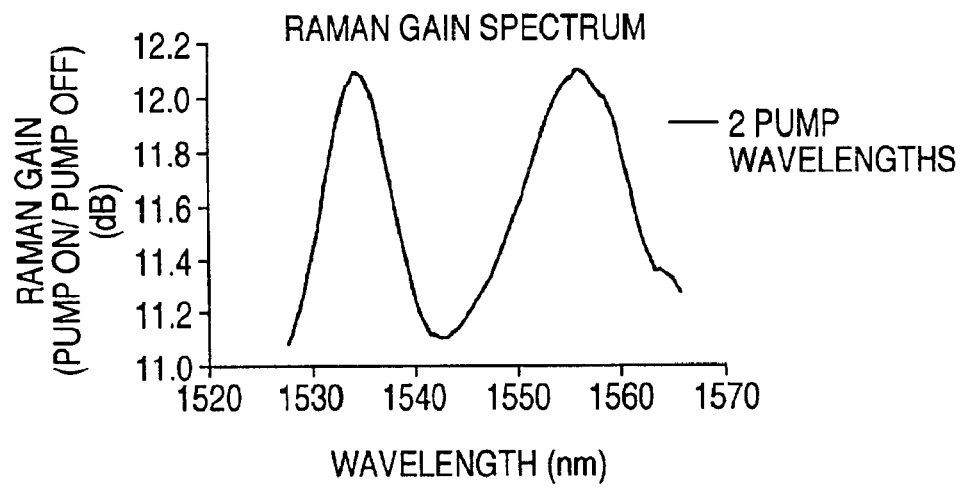
FIG. 5 is a graphical representation of an illustrative gain spectrum of a Raman amplifier having two optical pumps.

FIG. 5 shows the Raman gain spectrum of a Raman amplifier that has two wavelength pumps over an exemplary 38 nm wavelength band. In the illustrative embodiment of FIG. 5, the pumps have pumps wavelengths of 1425 nm and 1455 nm, respectively. The gain flatness and ripple are improved compared to the single pump wavelength amplifier. The composite gain spectrum is a linear superposition of the gain spectrum created by each Raman pump laser.

Figure 6:
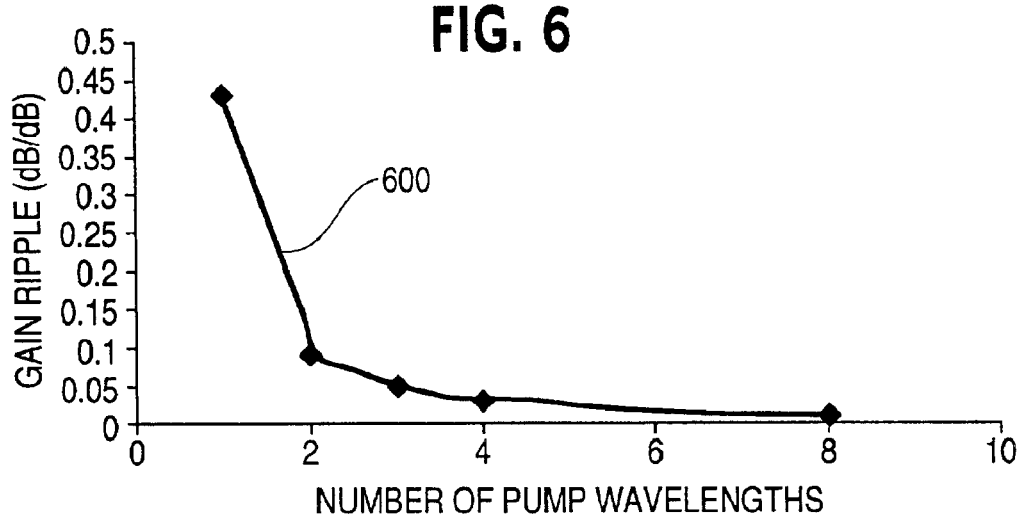
FIG. 6 is a graphical representation of the gain ripple versus the number of pump wavelengths in an illustrative Raman amplifier.

The effect of the addition of more pumps is shown graphically in FIG. 6, which shows the gain ripple versus number of pumps for an exemplary 38 nm wavelength band. As is known in the optical amplifier art, the greater the number of optical pumps (and thereby pump wavelengths), the flatter the gain spectrum across a particular wavelength range, and the less gain ripple there is across this wavelength range. Moreover, as can be readily appreciated by one having ordinary skill in the art, for a greater wavelength band, the entire curve 600 would shift upwardly, and for a narrower wavelength band the entire curve would shift downwardly. In any event, by multiplexing more pump wavelengths the gain ripple can be reduced. Moreover, in contrast with rare-earth based amplifiers, the gain of which is constrained to prescribed wavelength bands by well-defined (quantized) energy band, the gain bandwidth of Raman-based amplifiers can be expanded by multiplexing more pump wavelengths into a given waveguide (fiber). It is noted that gain bandwidths of greater than 100 nm can be attained. These gain bandwidths are usefully substantially flat and substantially ripple-free.

However, the increase in the number of optical pumps requires additional cascaded components to multiplex the optical pump onto a single waveguide. Moreover, it is generally desirable that the light from the pumps is unpolarized. As such, this requires polarization multiplexers. Ultimately, in the quest for substantially flat and substantially ripple-free amplification over a relatively wide bandwidth, such a design can increase the amplifier module complexity, size and cost to unacceptable levels.

To avoid the drawbacks of complexity, size and expense of the amplifier module, exemplary embodiments of the present invention generally reduce the number of pumps in each amplification stage (e.g., module), while achieving substantially flat gain and significantly reduced gain ripple, by choosing amplifiers having complementary gain spectra. For example, in the exemplary embodiment shown in FIG. 1 there may be four pump wavelengths used in the first amplifier 101 and two different pump wavelengths used in the second amplifier 102. Often, the two pump wavelengths in each and every amplifier would be the same. For example, every amplifier could have the spectrum of FIG. 5, which has a gain ripple of 0.106 or 10.6%.

In accordance with certain exemplary embodiments of the present invention, substantially complimentary gain shapes may be created by shifting the pumps of the first distributed amplifier to shorter wavelength or higher frequency and the pumps of the second distributed amplifier to longer wavelength or shorter frequency. The superposition of the substantially complementary gain spectra of the Raman amplifiers fosters a resultant gain spectrum that is substantially flat and has a significantly reduced gain ripple.

Figure 7:
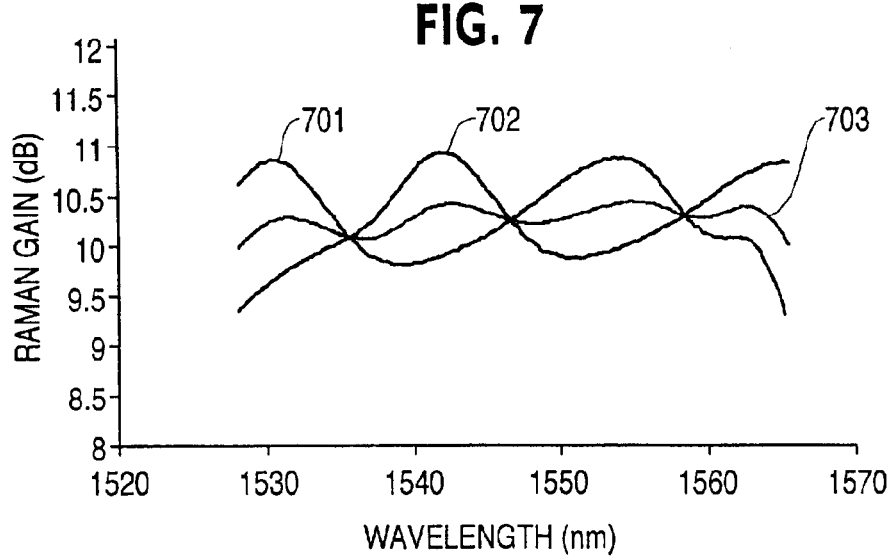
FIG. 7 is a graphical representation of the gain spectrum of an optical link having two-pump Raman amplifiers in accordance with an exemplary embodiment of the present invention.

For example, the gain spectrum of FIG. 5 was created using pumps at wavelengths 1425 and 1455 $\mu$m. FIG. 7 shows the gain spectra of complementary gain spectra according to an exemplary embodiment of the present invention. A first amplifier gain spectrum 701 is shifted relative to a second amplifier gain spectrum 702 to create a resultant gain spectrum 703 having gain ripple that is significantly lower than either the gain ripple of the first amplifier gain spectrum 701 or the second amplifier gain spectrum 702. For purposes of illustration, by starting with 1426 nm and 1455 nm pump wavelengths and shifting both pumps in the first amplifier lower by 2 nm and both pumps in the second amplifier higher by 8 nm a substantially complimentary gain spectrum may be created. The gain spectra of the first and second amplifiers have gain ripple of 0.184 and 0.170, respectively. Propagation through both the first and second amplifiers will average the gain spectrum. The resultant gain spectrum 703 has a gain ripple of 0.047, which is less than half the respective gain ripple of the first or second amplifiers, or the two-wavelength amplifier of FIG. 5.

In the example just described, the power at each pump wavelength was not changed; rather the wavelength was shifted so the wavelength spacing between pumps in the first and second amplifier did not change. In another exemplary embodiment, the frequency of the pumps in the first amplifier may be changed by the same amount and the frequency of the pumps in the second amplifier may be shifted by another amount different from that of the first amplifier. The frequency difference between the pumps within the first or second amplifier remains the same. Still other variants of this teaching are possible to achieve a particular desired end.

Figure 8:
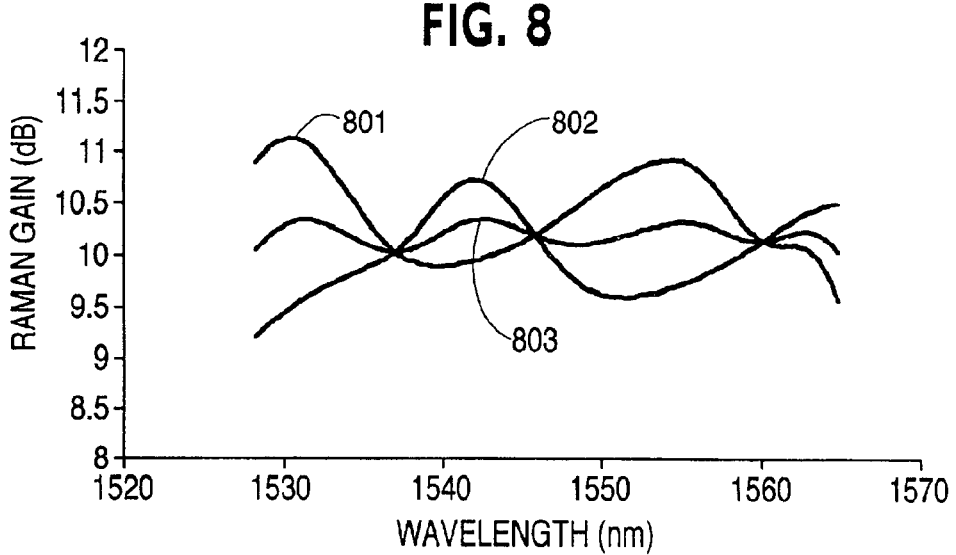
FIG. 8 is a graphical representation of the gain spectrum of an optical link having two-pump Raman amplifiers in accordance with an exemplary embodiment of the present invention.

In yet another exemplary embodiment, the powers of the first and second amplifiers are readjusted to lower the gain ripple further. This 're-optimization' of the power for the previous pump wavelengths is shown graphically in FIG. 8. In this example, a first amplifier gain spectrum 801 is shifted relative to a second amplifier gain spectrum 802, forming a resultant gain spectrum 803. In this exemplary embodiment, the gain ripple of the resultant gain spectrum 803 has further been reduced to 0.032, which is significantly less than that of either the first or second amplifier gain spectra over a particular wavelength range.

As can be appreciated, in carrying the present invention, the number of optical pumps, pump powers and the pump wavelengths may be selected based on factors such as desired gain ripple over the desired wavelength band and optimal pump efficiency (pump power/Raman gain); considering also practical aspects such as module size, thermal characteristics and cost. For example, while it may be useful to increase the number of pumps to reduce ripple, from a practical perspective, the cost, thermal characteristics, etc., may limit the number of pumps actually implemented.

In practice, once the pump wavelengths of the first module are chosen, the gain spectrum of the first of the Raman amplifiers (e.g. first distributed Raman amplifier 101 of FIG. 1) is determined, and the selection of the pump wavelengths for the second Raman amplifier (e.g., second distributed Raman amplifier 102) can be determined. In accordance with exemplary embodiments of the present invention, these pump wavelengths may be shifted (e.g., as described above) relative to those of the first Raman amplifier, resulting in a gain spectrum that is shifted relative to that of the first Raman amplifier.

In accordance with yet another exemplary embodiment of the present invention, the pump wavelengths of adjacent amplifiers have an alternating pattern. Namely, the pump wavelengths of one amplifier are in between those of the next amplifier. For example, if the pump wavelengths are labeled starting in the blue-end of the spectrum, then the first amplifier (e.g., first distributed Raman amplifier 101) includes odd-wavelength pumps; while the second amplifier (e.g., second distributed Raman amplifier 102) would have the even wavelength pumps. Of course, this pattern would continue with the third amplifier's having the same odd pump wavelengths as the first amplifier, and the fourth having the same even wavelengths as the second amplifier. Finally, it is noted that this pattern is merely illustrative, and variations, including having the first amplifier having even wavelength pumps; and the second amplifier having odd wavelength pumps are possible.

As described, in accordance with an exemplary embodiment of the present invention, the gain spectrum of the second distributed Raman amplifier is shifted by an amount which results in its being the complement of the gain spectrum of the first Raman amplifier module. Stated differently, the pumps wavelengths of the second distributed Raman amplifier (e.g., second distributed Raman amplifier 102) are chosen to create a gain spectrum, which when superposed with the gain spectrum of the first distributed Raman amplifier (e.g., first distributed Raman amplifier 101), results in a composite gain spectrum at the output of the second distributed Raman amplifier 102 that is substantially flat and has substantially no gain ripple. Usefully, the wavelength spacing of the pumps of the second distributed Raman amplifier 102 is the same as the wavelength spacing of the pumps of the first distributed Raman amplifier 101, but are off-set by a fixed wavelength or frequency shift to realize the desired complementary gain spectrum.

Figure 9:
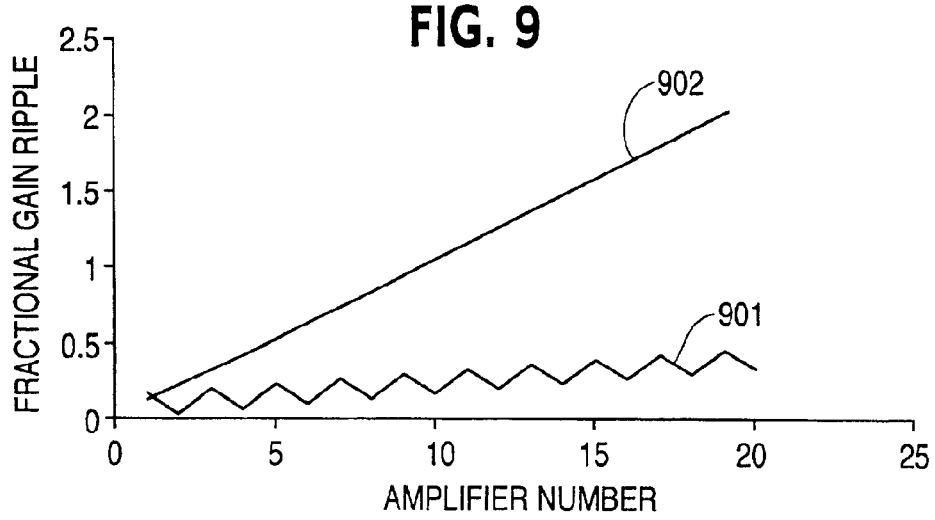
FIG. 9 is a graphical representation comparing the fractional gain ripple at various stages of an optical link of an exemplary embodiment of the present invention with that of a known optical link.

Another useful benefit of an exemplary embodiment of the present invention is a reduction (compared to known amplifier structures) in gain ripple 'build-up' throughout the optical link. For purposes of illustration, consider the optical link of the exemplary embodiment of FIG. 1 and the use of two wavelength pumps in previously described exemplary embodiments. FIG. 9 shows a comparison of ripple build-up in an amplifier as the signals propagate through the amplifiers in a known optical link and an optical link of an exemplary embodiment of the present invention. In optical links of exemplary embodiments of the present invention, much of the ripple of the first amplifier of a pair of amplifiers (e.g., first and second Raman amplifiers 101 and 102, respectively) is compensated for by the complimentary ripple of the second amplifier of the pair. The ripple build-up of an optical link on accordance with an exemplary embodiment of the present invention is shown at 901. By contrast, known optical links having the same pump wavelengths in every amplifier, results in a linear increase in the gain ripple 902, which also increases at a faster rate than gain ripple 901. In this example, 20 amplifiers are considered to illustrate the dependence of gain ripple on number of spans.

In the exemplary embodiments described thus far, two pump wavelengths were used in the first Raman amplifier (e.g., first distributed Raman amplifier 101), and two pumps in the second Raman amplifier (e.g., second distributed Raman amplifier 102), over a gain bandwidth in the range of approximately 1528 nm to approximately 1565 nm. The use of two pump wavelengths in each amplifier, and the gain bandwidth are merely exemplary of the present invention. In an exemplary embodiment described presently, four pumps are used in each amplifier, and the gain bandwidth is increased as well.

Figure 10:
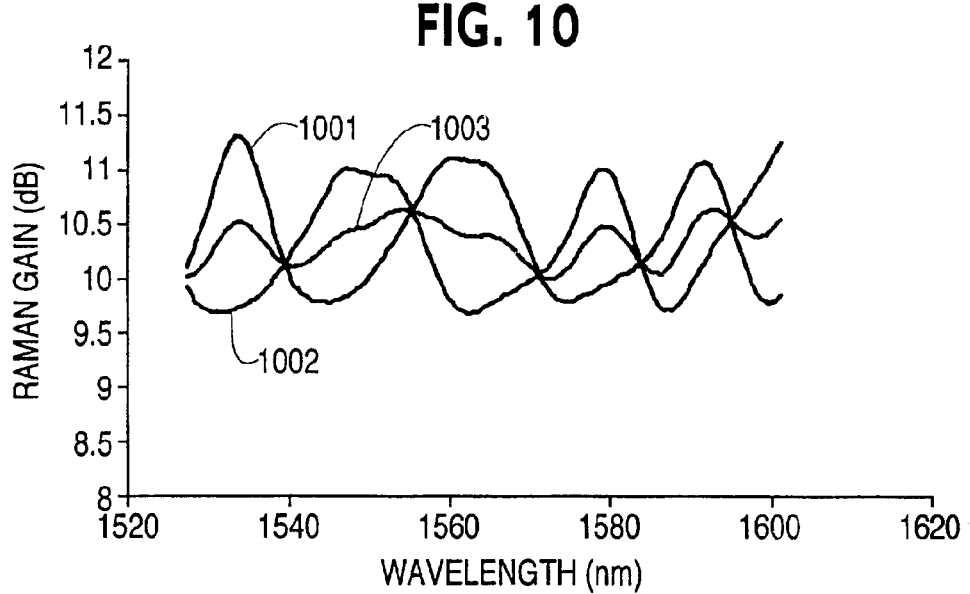
FIG. 10 is a graphical representation of the gain spectrum of an optical link having four-pump Raman amplifiers in accordance with an exemplary embodiment of the present invention.

In accordance with another exemplary embodiment of the present invention, the gain bandwidth is in the range of approximately 1527 nm to 1601 nm and the first and second Raman amplifiers have four pump wavelengths each. Known optical links having the same wavelengths in each amplifier gives a gain ripple of 0.152. In the present exemplary embodiment of the present invention, by shifting the wavelengths in the first amplifier by 5.3 nm lower and in the second amplifier by 5.3 nm higher, the average (resultant) gain ripple through both amplifiers is 0.064. The gain ripple of the first and second amplifiers individual gain ripple is 0.163 and 0.155, respectively. The gain spectrum of the first and second amplifier and average are shown in FIG. 10, which shows the first gain spectrum of the first amplifier 1001; the second gain spectrum of the second amplifier 1002; and the resultant gain spectrum 1003.

Figure 11:
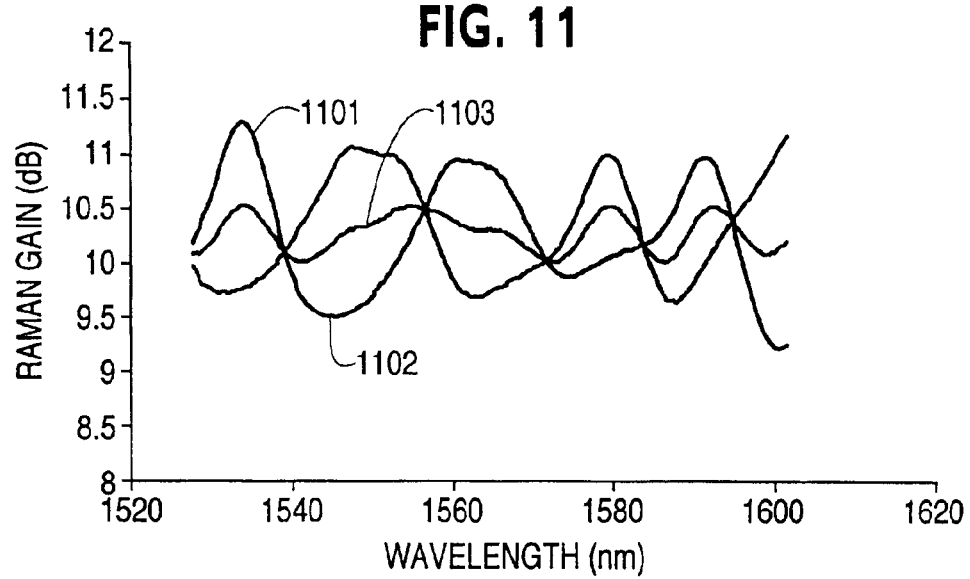
FIG. 11 is a graphical representation of the gain spectrum of an optical link having four-pump Raman amplifiers in accordance with an exemplary embodiment of the present invention.

In another embodiment, the pump powers are also changed (reoptimized) to further flatten the gain ripple to 0.050. The gain spectra of the first and second amplifiers are shown at 1101 and 1102, respectively; and an average or resultant gain spectrum 1103 for reoptimized pump power is shown in FIG. 11.

In accordance with the embodiments of the present invention, a substantially flat gain spectrum having substantially no gain ripple is realized by the suitable selection of optical pumps as described in via exemplary embodiments above. In accordance with at least one exemplary embodiments, the number of optical pumps (and other needed components) in each amplifier module is reduced compared to known structures; but the gain ripple and flatness is at least as good. Ultimately, optical links incorporating the present invention can perform as well or better than known optical links with substantially reduced complexity and cost. Optical links of the present invention will perform similar to those with twice as many pump wavelengths in each and every amplifier with the associated extra complexity and cost.

The invention being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

What is claimed is:

1. An optical link, comprising:
   a first set of optical amplifiers that includes a first distributed Raman amplifier having a first gain spectrum with a first gain ripple and a first discreet Raman amplifier having a second gain spectrum with a second gain ripple; and
   a second set of optical amplifiers that includes a second distributed Raman amplifier having a third gain spectrum with a third gain ripple and a second discrete Raman amplifier having a fourth gain spectrum with a fourth gain ripple,
   wherein the first set of optical amplifiers is configured such that the first gain spectrum and the second gain spectrum combine to produce a first combined gain spectrum having a first resultant gain ripple over a first wavelength range that is substantially less than the first gain ripple and the second gain ripple over the first wavelength range, and
   wherein the second set of optical amplifiers is configured such that the third gain spectrum and the fourth gain spectrum combine to produce a second combined gain spectrum having a second resultant gain ripple over a second wavelength range that is substantially less than the third gain ripple and the fourth gain ripple over the second wavelength range.

2. The optical link of claim 1, wherein the first distributed Raman amplifier has a first set of optical pumps, the first discreet Raman amplifier has a second set of optical pumps, the second distributed Raman amplifier has a third set of optical pumps, and the second discreet Raman amplifier has a fourth set of optical pumps.

3. The optical link of claim 2, wherein the first set of optical pumps has a first set of odd wavelengths, and the second set of optical pumps has a first set of even wavelengths, the first set of even wavelengths alternating in sequence with the first set of odd wavelengths, and wherein the third set of optical pumps has a second set of odd wavelengths, and the fourth set of optical pumps has a second set of even wavelengths, the second set of even wavelengths alternating in sequence with the second set of odd wavelengths.

4. The optical link of claim 3, wherein the first set of odd wavelengths has a first spacing therebetween, and the first set of even wavelengths has a second spacing therebetween, the first spacing being substantially equal to the second spacing, and wherein the second set of odd wavelengths has a third spacing therebetween, and the second set of even wavelengths has a fourth spacing therebetween, the third spacing being substantially equal to the fourth spacing.

5. The optical link of claim 3, wherein the first set of oven wavelengths is offset from the first set of odd wavelengths by a first fixed wavelength, and the second set of even wavelengths is offset from the second set of odd wavelengths by a second fixed wavelength.

6. The optical link of claim 3, wherein the first set of even wavelengths is offset from the first set of odd wavelengths by a first fixed frequency, and the second set of even wavelengths is offset from the second set of odd wavelengths by a second fixed frequency.

7. The optic of link of claim 1, wherein the first resultant gain ripple is approximately one-half of either the first gain ripple or the second gain ripple, and the second resultant gain ripple is approximately one-half of either the third gain ripple or the fourth gain ripple.

8. The optical link of claim 1, wherein the first resultant gain ripple is less than approximately one-half of either the first gain ripple or the second gain ripple, and the second resultant gain ripple is less than approximately one-half of either the third gain ripple or the fourth gain ripple.

9. The optical link of claim 1, wherein the first gain spectrum is a substantial complement to the second gain spectrum and the third gain spectrum is a substantial complement to the fourth gain spectrum.

10. The optical link of claim 1, wherein the first distributed Raman amplifier and the first discrete Raman amplifier each have two pump wavelengths.

11. The optical link or claim 1, wherein the first distributed Raman amplifier and the first discrete Raman amplifier each have four pump wavelengths.

12. A method for amplifying an optical signal, the method comprising:

providing a first set of optical amplifiers that includes a first distributed Raman amplifier having a first gain spectrum with a first gain ripple and a first discreet Raman amplifier having a second gain spectrum with a second gain ripple, and a second set of optical amplifiers that includes a second distributed Raman amplifier having a third gain spectrum with a third gain ripple and a second discrete Raman amplifier having a fourth gain spectrum with a fourth gain ripple;

forming a first combined gain spectrum having a first resultant gain ripple over a first wavelength range that is substantially less than the first gain ripple and the second gain ripple over the first wavelength range; and forming a second combined gain spectrum having a second resultant gain ripple over a second wavelength range that is substantially less than the third gain ripple and the fourth gain ripple over the second wavelength range.

13. The method of claim 12, wherein the steps of forming the first and second combined gain spectra include superimposing the first gain spectrum and the second gain spectrum and superimposing the third gain spectrum with the fourth gain spectrum.

14. The method of claim 12, wherein the first resultant gain ripple is approximately one-half of either the first gain ripple or the second gain ripple, and the second resultant gain ripple is approximately one-half of either the third gain ripple or the fourth gain ripple.

15. The method of claim 12, wherein the first resultant gain ripple is less than approximately one-half of either the first gain ripple or the second gain ripple, and the second resultant gain ripple is less than approximately one-half of either the third gain ripple or the fourth gain ripple.

16. The method of claim 12, wherein the first gain spectrum is a substantial complement to the second gain spectrum, and the third gain spectrum is a substantial complement to the fourth gain spectrum.

17. The method of claim 12, wherein the first distributed Raman amplifier and the first discrete Raman amplifier each have two pump wavelengths.

18. The method of claim 12, wherein the first distributed Raman amplifier and the first discrete Raman amplifier each have four pump wavelengths.

* * * * *